United States Patent
Kim et al.

(10) Patent No.: US 11,314,204 B2
(45) Date of Patent: Apr. 26, 2022

(54) HOLOGRAPHIC RECONSTRUCTION APPARATUS AND METHOD

(71) Applicant: NAEILHAE, CO. LTD., Seongnam-si (KR)

(72) Inventors: Byung Mok Kim, Seoul (KR); Mal Eum Sung, Seoul (KR); Seong Jin Park, Seoul (KR); Sang Jin Lee, Seoul (KR)

(73) Assignee: NAEILHAE, CO. LTD.

( * ) Notice: Subject to any disclaimer, the term of this patent is extended or adjusted under 35 U.S.C. 154(b) by 819 days.

(21) Appl. No.: 16/082,774

(22) PCT Filed: Dec. 4, 2017

(86) PCT No.: PCT/KR2017/014074
§ 371 (c)(1),
(2) Date: Sep. 6, 2018

(87) PCT Pub. No.: WO2019/112073
PCT Pub. Date: Jun. 13, 2019

(65) Prior Publication Data
US 2020/0379406 A1    Dec. 3, 2020

(51) Int. Cl.
*G03H 1/04*    (2006.01)
*G02B 27/10*    (2006.01)
(Continued)

(52) U.S. Cl.
CPC ....... *G03H 1/0443* (2013.01); *G02B 27/1006* (2013.01); *G03H 1/0866* (2013.01);
(Continued)

(58) Field of Classification Search
CPC ...... G03H 1/0443; G03H 1/0866; G03H 1/10; G03H 1/16; G03H 1/2202;
(Continued)

(56) References Cited

U.S. PATENT DOCUMENTS 7,649,160 B2    1/2010    Colomb et al.
2008/0265130 A1*  10/2008    Colomb ............... G03H 1/0866
                                                250/201.9

FOREIGN PATENT DOCUMENTS

CN       101576731 A    11/2009
KR    1020100095302 A     8/2010
(Continued)

OTHER PUBLICATIONS

International Search Report dated Aug. 24, 2018, by the Korean Intellectual Property Office in corresponding International Application No. PCT/KR2017/014074. (3 pages).

*Primary Examiner* — Jade R Chwasz
(74) *Attorney, Agent, or Firm* — Buchanan Ingersoll & Rooney PC

(57) ABSTRACT

Provided are an improved holographic reconstruction apparatus and method.
A holographic reconstruction method includes: obtaining an object hologram of a measurement target object; extracting reference light information from the obtained object hologram; calculating a wavenumber vector constant of the extracted reference light information, and generating digital reference light by calculating a compensation term of the reference light information by using the calculated wavenumber vector constant; extracting curvature aberration information from the object hologram, and then generating digital curvature in which a curvature aberration is compensated for; calculating a compensated object hologram by multiplying the compensation term of the reference light information by the obtained object hologram; extracting phase information of the compensated object hologram; and reconstructing 3-dimensional (3D) shape information and quantitative thickness information of the measurement target object by calculating the quantitative thickness informa- (Continued)

tion of the measurement target object by using the extracted phase information of the compensated object hologram.

8 Claims, 6 Drawing Sheets

(51) Int. Cl.
*G03H 1/08* (2006.01)
*G03H 1/10* (2006.01)
*G03H 1/16* (2006.01)
*G03H 1/22* (2006.01)
*G03H 1/00* (2006.01)

(52) U.S. Cl.
CPC ............... *G03H 1/10* (2013.01); *G03H 1/16* (2013.01); *G03H 1/2202* (2013.01); *G03H 2001/005* (2013.01); *G03H 2001/0883* (2013.01); *G03H 2222/12* (2013.01); *G03H 2223/14* (2013.01); *G03H 2223/24* (2013.01); *G03H 2226/02* (2013.01)

(58) Field of Classification Search
CPC ..... G03H 2001/005; G03H 2001/0883; G03H 2222/12; G03H 2223/14; G03H 2223/24; G03H 2226/02; G03H 1/0808; G03H 1/0486; G03H 2001/0033; G02B 27/1006; G02B 30/40; G02B 27/48; G02B 27/144; G02B 21/367; G02B 21/088; G01N 2015/1497; G01N 2015/1454; G01N 15/1475
USPC ..................................... 359/9, 10, 11, 32, 33
See application file for complete search history.

(56) References Cited

FOREIGN PATENT DOCUMENTS

| KR | 1020120014355 A | 2/2012 |
| KR | 101139178 B1 | 4/2012 |
| KR | 101441245 B1 | 9/2014 |
| KR | 10-1605178 B1 | 3/2016 |
| KR | 1020160029606 A | 3/2016 |
| KR | 10-2017-0120462 A | 10/2017 |
| KR | 10-2018-0010659 A | 1/2018 |

* cited by examiner

HOLOGRAPHIC RECONSTRUCTION APPARATUS AND METHOD

TECHNICAL FIELD

The present disclosure relates to an improved holographic reconstruction apparatus and method.

More particularly, the present disclosure relates to an improved holographic reconstruction apparatus and method, which are capable of being applied to defect detecting apparatuses having a ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens, because the improved holographic reconstruction apparatus and method reconstruct 3D shape information and quantitative thickness information of an object by obtaining only one object hologram and using only an object hologram obtained without using a reference hologram and digital reference light generated from the obtained object hologram, and thus, are able to solve issues related to a complex structure of an optical apparatus required during conventional one-shot-type digital holography reconstruction using one object hologram and consequent high costs, are able to perform holographic reconstruction by using a simple structure and with low costs, have general versatility of being applicable to both conventional reflective and transmissive hologram reconstruction apparatuses, and in particular, do not require reference light during hologram reconstruction, and are able to reconstruct in real time a quantitative 3D image of a measurement target object.

BACKGROUND ART

A digital holographic microscope is a microscope that measures a shape of an object by using digital holography technology.

A general microscope is an apparatus for measuring a shape of an object by measuring intensity of light reflected from or passed through the object when a general ordinary light source illustrates the object, whereas a digital holographic microscope is an apparatus for reconstructing shape information of an object based on information that is obtained by measuring and recording, in a digital manner, interference and diffraction phenomena of light occurring when the light illuminates the object.

In other words, in digital holographic technology, light of a single-wavelength, such as a laser beam, is generated, the light is split into two lights by using a beam splitter, wherein one light (referred to as reference light) directly illustrates an image sensor while the other light illustrates a measurement target object and light (referred to as object light) reflected from the measurement target object illustrates the image sensor. At this time, an interference phenomenon between the reference light and the object light occurs in the image sensor, and interference pattern information of the reference light and the object light is recorded in by a digital image sensor and a computer reconstructs a shape of the measurement target object by using the recorded interference pattern information. The recorded interference pattern information is generally referred to as a hologram.

Meanwhile, in existing optical holographic technology other than the digital holographic technology, interference pattern information of the interference light and the object light is recorded on a special film, and when the reference light illuminates the special film where the interference pattern information is recorded to reconstruct a shape of the measurement target object, a virtual shape of the measurement target object is reconstructed at an original location of the measurement target object.

Compared with the existing optical holographic microscope, the digital holographic microscope is distinguished in that the image sensor measures and stores, in a digital manner, the interference pattern information, and the shape of the measurement target object is reconstructed by processing the stored interference pattern information via a numerical calculation method using a computer apparatus or the like, instead of an optical method.

In an existing digital holographic microscope, a laser light source of a single-wavelength is used. However, when the laser light source of a single-wavelength is used, measurement resolution, i.e., a smallest measurement unit, of an object is restricted to a wavelength of the laser light source. Also, when the existing digital holographic microscope uses a laser light source of two or multiple wavelengths, expenses may increase due to the use of light sources having different wavelengths, or it may be difficult to measure, in real time, 3-dimensional (3D) change information of an object to be measured due to sequential obtaining of holograms by using light sources having different wavelengths.

Also, in the existing digital holographic microscope, the computer generates a computer generated hologram (CGH) to reconstruct the shape of the measurement target object, the CGH is displayed on a spatial light modulator (SLM), and when the reference light illustrates the CGH, a 3D hologram of the measurement target object is obtained via diffraction of the reference light. At this time, expensive (at least tens of millions of won) SLM is required, and thus it is difficult to commercialize the existing digital holographic microscope.

One of methods for solving the above issues related to existing digital holographic technology is disclosed in, for example, KR 10-2016-0029606 (hereinafter, referred to as a "publicized prior art") publicized on Mar. 15, 2016 after being filed on Sep. 5, 2014 under KR 10-2014-0119395 with the title of Digital Holographic Microscopy and Method for Generating Digital Holographic Image by Eunsoo Kim et al.

FIG. 1 is a block diagram illustrating in detail a dual-wavelength digital holographic microscopic apparatus according to the published prior art.

Referring to FIG. 2, the dual digital holographic microscopic apparatus of the publicized prior art includes a mixed light source 100, a wavelength splitter 200, an interference pattern obtainer 300, a nosepiece 400, an image sensor 500, an image storage unit 600, a controller 700, and an object shape reconstructor 800.

The mixed light source 100 includes a mixed light source emitter 110 and a light source lens 120. The mixed light source emitter 110 emits mixed light having a wavelength band distributed through various bands instead of a single band. The light source lens 120 optically adjusts the mixed light generated by the mixed light source emitter 110, and transmits the adjusted mixed light to the wavelength splitter 200.

The wavelength splitter 200 includes a first beam splitter 210, a first color filter 220, a second color filter 230, and a first reflector 240. The first beam splitter 210 receives the mixed light from the mixed light source 100 and splits the mixed light into two lights. Here, the first beam splitter 210 splits and transmits the mixed light in different directions. The first color filter 220 obtains a first ray having a predetermined single-wavelength by receiving one of the lights split by the first beam splitter 210. Here, the light input to the first color filter 220 is filtered through the first color filter 220, and the first ray having the single-wavelength determined according to characteristics of the first color filter 220 is obtained. The second color filter 230 obtains a second ray having a wavelength different from that of the first ray by receiving the remaining one of the lights split by the first beam splitter 210, in the same manner as the first color filter 220. Also, the second ray is transmitted to the interference pattern obtainer 300. The first reflector 240 receives the first ray obtained by the first color filter 220, and reflects the first ray to the interference pattern obtainer 300.

The interference pattern obtainer 300 includes a second beam splitter 310, a third beam splitter 320, a second reflector 330, a third color filter 340, and a third reflector 350. The second beam splitter 310 receives the first ray from the wavelength splitter 200, and splits the first ray into a first object light and a first reference light. Here, the second beam splitter 310 splits and transmits the first ray to different directions. The third beam splitter 320 also receives the second ray and splits the second ray into a second object light and a second reference light in the same manner as the second beam splitter 310. The second reflector 330 receives the first reference light, and transmits a first reflected reference light in which the first reference light is reflected to the second beam splitter 31. The third color filter 340 receives the first reference light split by the second beam splitter 310 and transmits the first reference light to the second reflector 330, and receives the first reflected reference light and transmit the first reflected reference light to the second beam splitter 310. Also, the third color filter 340 prevents the second object light from reaching the second reflector 330 when the second object light is split at the second beam splitter 310 and transmitted to the second reflector 330. In this regard, the third color filter 340 is a color filter having the same characteristics as the first color filter 220 with respect to light transmission. The third reflector 350 receives the second reference light, and transmits a second reflected reference light in which the second reference light is reflected to the third beam splitter 320, and here, the second and third reflectors 330 and 350 may be configured such that angles are adjusted according to control of the controller 700, such that an off-axis hologram is realized.

The first and second object lights obtained as above are respectively converted into first and second reflected object lights through following processes, and then are transmitted to the image sensor 500. The second beam splitter 310 transmits the first object light split as such to a measurement target object loaded on the nosepiece 400, and the third beam splitter 320 transmits the second object light to the measurement target object. Here, reflected light of the first object light from the measurement target object is referred to as the first reflected object light. Also, reflected light of the second object light from the measurement target object is referred to as the second reflected object light. The second beam splitter 310 receives the first and second reflected object lights and transmits the first and second reflected object lights to the third beam splitter 320. The third beam splitter 320 transmits the first and second reflected object lights received as such to the image sensor 500 again.

Also, the first and second reflected reference lights obtained as such are transmitted to the image sensor 500 through following processes. In detail, the second beam splitter 310 receives the first reflected reference light reflected from the second reflector 330, and transmits the first reflected reference light to the third beam splitter 320. The third beam splitter 320 receives the first reflected reference light from the second beam splitter 310 and the second reflected reference light reflected from the third reflector 350, and transmits the first and second reflected reference lights to the image sensor 500 again. Accordingly, the first reflected object light, the first reflected reference light, the second reflected object light, and the second reflected reference light are all transmitted to the image sensor 500 from the third beam splitter 320, and then interfere with each other to generate an interference pattern.

Meanwhile, the second and third reflectors 330 and 350 are characterized in that the angles are adjustable in various directions according to control of the controller 700 so as to form an off-axis system in which rays of different wavelengths form different interference patterns. In other words, when the angles of the second and third reflectors 330 and 350 are different from each other, the first reflected reference light reflected from the second reflector 330 and the second reflected reference light reflected from the third reflector 350 are spaced apart from each other, and thus when the first and second reference lights combine with the first and second reflected object lights that reached the image sensor 500 to form interference patterns, off-axis interference patterns different according to wavelengths are formed.

The nosepiece 400 includes an object holder 410 and an objective lens 420. The object holder 410 fixes the measurement target object to a holder to be measured, and the objective lens 420 optically adjusts the first and second object lights incident on the measurement target object.

The image sensor 500 projects the interference patterns obtained by the interference pattern obtainer 300 on to a digital image sensor, measures the projected interference patterns by using the digital image sensor, and converts measured values to a discrete signal. Generally, a hologram is where the interference patterns are recorded. The digital image sensor may be any one of various image sensors, such as a charge-coupled device (CCD).

The image storage unit 600 stores the interference patterns converted into the discrete signal by the image sensor 500 in any one of various storage media, such as a memory and a disk apparatus.

In order to realize the off-axis system and obtain the interference patterns, the controller 700 controls the interference pattern obtainer 300 such that locations and angles of the second and third reflectors 330 and 350 are adjusted, and in order to adjust the first and second object lights incident on the measurement target object, the controller 700 controls the nosepiece 400 to adjust the objective lens 420, in order to convert the information about the interference patterns into the discrete signal, the controller 700 controls the image sensor 500, and in order to store the interference patterns converted into the discrete signal, the controller 700 controls the image storage unit 600.

The object shape reconstructor 800 includes a phase information obtainer 810, a thickness information obtainer 820, and a shape reconstructor 830. The phase information obtainer 810 obtains each of phase information of the interference pattern with respect to the first ray and phase information of the interference pattern with respect to the second ray by using the interference patterns, the thickness information obtainer 820 obtains thickness information of the measurement target object by using the phase information, and the shape reconstructor 830 reconstructs a real-time 3D shape of the measurement target object by using the thickness information. Here, the thickness information of the measurement target object includes difference information of paths of the first and second object lights and the first and second reference lights. Due to such an optical path difference of the first and second object lights and the first and second reference lights, the interference patterns are formed when the first and second object lights and the first and second reference lights overlap with each other.

In the publicized prior art, 3D shape information of the measurement target object is reconstructed in real time by increasing measurement resolution of the measurement target object, and measuring and recording holograms of the measurement target object in real time, the holograms changing according to time, but following issues still exist.

In detail, in the publicized prior art, since the mixed light source having wavelength bands distributed through several bands instead of a single band is used, so as to obtain at least two single-wavelengths, the first color filter 220, the second color filter 230, and the first reflector 240 are used for the wavelength splitter 200 to obtain the first and second rays having different wavelengths. Also, the interference pattern obtainer 300 additionally uses the third beam splitter 320 to split the second ray, the third reflector 350 to reflect the second ray, and the third color filter 340 to prevent the second ray from incident on the second reflector 330. Accordingly, an overall structure of the apparatus is complex, and manufacturing costs are still high.

Accordingly, a new apparatus that uses a light source of a single-wavelength while solving the above issues is required.

PRIOR ART DOCUMENTS

Patent Document (Patent Document 1) 1. KR 10-2016-0029606
(Patent Document 2) 2. KR 10-2010-0095302
(Patent Document 3) 3. KR 10-2012-0014355
(Patent Document 4) 4. KR 10-1139178
(Patent Document 5) 5. KR 10-1441245
(Patent Document 6) 6. U.S. Pat. No. 7,649,160

DESCRIPTION OF EMBODIMENTS

Technical Problem

Provided are an improved holographic reconstruction apparatus and method, which are capable of being applied to defect detecting apparatuses having a ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens, because the improved holographic reconstruction apparatus and method reconstruct 3D shape information and quantitative thickness information of an object by obtaining only one object hologram and using only an object hologram obtained without using a reference hologram and digital reference light generated from the obtained object hologram, and thus are able to solve issues related to a complex structure of an optical apparatus required during conventional one-shot-type digital holography reconstruction using one object hologram and consequent high costs, are able to perform holographic reconstruction by using a simple structure and with low costs, have general versatility of being applied to both conventional reflective and transmissive hologram reconstruction apparatuses, in particular, do not require a reference hologram during hologram reconstruction, are able to reconstruct a quantitative 3D image of a measurement target object in real time.

Solution to Problem

According to an aspect of the present disclosure, a holographic reconstruction apparatus includes: a light source configured to emit single-wavelength light; a collimator configured to collimate the single-wavelength light emitted from the light source; a first beam splitter configured to split the single-wavelength light that passed through the collimator into object light and reference light; an object light objective lens through which the object light obtained by the first beam splitter passes; a reference light objective lens through which the reference light received by the first beam splitter passes; an optic mirror reflecting the reference light that has passed through the reference light objective lens; a recording medium configured to record an interference pattern formed when the object light reflected by a surface of a measurement target object and the reference light reflected by the optic mirror pass through the object light objective lens and the reference light objective lens, respectively, and are transmitted to the first beam splitter; and a processor configured to receive and store an image file generated when the recording medium converts the interference pattern, wherein the processor is further configured to generate digital reference light by extracting reference light information of an object hologram from the object hologram obtained from the image file, and reconstruct 3-dimensional (3D) information of the measurement target object by calculating an object hologram that is compensated for by using the object hologram and the digital reference light and extracting phase information of the compensated object hologram.

According to another aspect of the present disclosure, a holographic reconstruction apparatus includes: a light source configured to emit single-wavelength light; a collimator configured to collimate the single-wavelength light emitted from the light source; a first beam splitter configured to split the single-wavelength light that passed through the collimator into object light and reference light; an object light objective lens through which object penetration light including information of a measurement target object passes after the object light received by the first beam splitter passes through the measurement target object; a reference light objective lens through which the reference light received by the first beam splitter passes; a first optic mirror reflecting the reference light that passed through the reference light objective lens; a second optic mirror reflecting the object penetration light that passed through the object light objective lens; a second beam splitter to which the reference light reflected by the first optic mirror and the object penetration light reflected by the second optic mirror are transmitted; a recording medium configured to record an interference pattern formed by the reference light and the object penetration light, wherein the reference light and the object penetration light are transmitted to the second beam splitter; and a processor configured to receive and store an image file generated when the recording medium converts the interference pattern, wherein the processor is further configured to generate digital reference light by extracting reference light information of an object hologram from the object hologram obtained from the image file, and reconstruct 3-dimensional (3D) information of the measurement target object by calculating an object hologram that is compensated for by using the object hologram and the digital reference light and extracting phase information of the compensated object hologram.

According to another aspect of the present disclosure, a holographic reconstruction method includes: obtaining an object hologram of a measurement target object; extracting reference light information from the obtained object hologram; calculating a wavenumber vector constant of the extracted reference light information, and generating digital reference light by calculating a compensation term of the reference light information by using the calculated wavenumber vector constant; extracting curvature aberration information from the object hologram, and then generating digital curvature in which a curvature aberration is compensated for; calculating a compensated object hologram by multiplying the compensation term of the reference light information by the obtained object hologram; extracting phase information of the compensated object hologram; and reconstructing 3-dimensional (3D) shape information and quantitative thickness information of the measurement target object by calculating the quantitative thickness information of the measurement target object by using the extracted phase information of the compensated object hologram.

Advantageous Effects of Disclosure

Following advantages are achieved when an improved holographic reconstruction apparatus and method according to the present disclosure are used.

Issues related to a complex structure of an optical apparatus required during conventional one-shot-type digital holography reconstruction using one object hologram and consequent high costs may be solved.

Also, holographic reconstruction may be performed by using a simple structure and with low costs.

General versatility of being applicable to both conventional reflective and transmissive hologram reconstruction apparatuses is exhibited.

In particular, a reference hologram is not required during hologram reconstruction, and a quantitative 3D image of a measurement target object may be reconstructed in real time.

Also, the improved holographic reconstruction apparatus and method may be applied to defect detecting apparatuses having a ultrafine structure, such as a thin-film transistor (TFT) and a semiconductor, medical devices that need to display a precise 3-dimensional (3D) image, and other detecting, determining, or displaying apparatuses in various fields including refractive index error detection of a transparent object, such as a lens.

Additional advantages of the present disclosure will be more apparent from the following description taken in conjunction with the accompanying drawings, in which like reference numerals denote like elements.

BEST MODE

Hereinafter, the present disclosure will be described in detail with reference to embodiments and drawings.

Figure 1:
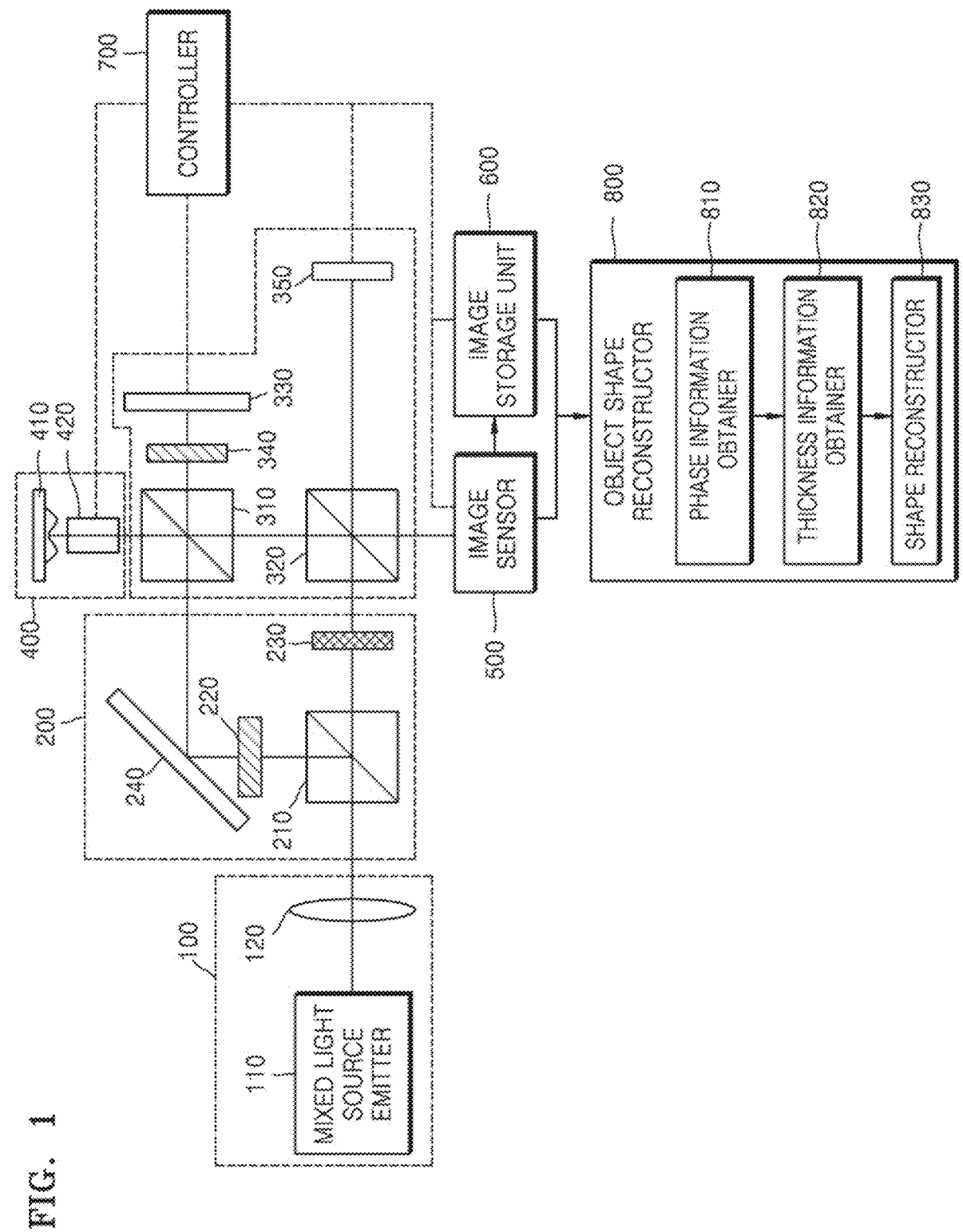
FIG. 1 is a block diagram illustrating in detail a dual-wavelength digital holographic microscopic apparatus according to the published prior art.
Figure 2A:
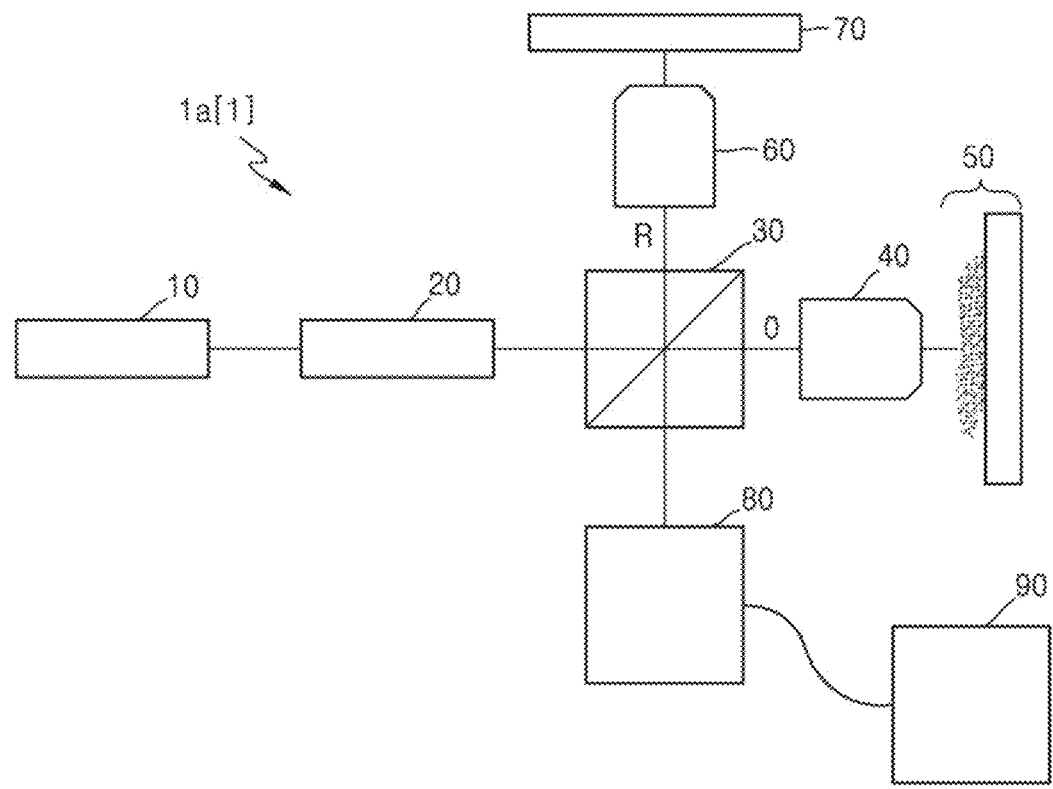
FIG. 2A is a block diagram of a holographic reconstruction apparatus according to a first embodiment of the present disclosure.

FIG. 2A is a block diagram of a holographic reconstruction apparatus according to a first embodiment of the present disclosure.

Referring to FIG. 2A, a holographic reconstruction apparatus 1a according to the first embodiment of the present disclosure includes: a light source 10 configured to emit a single-wavelength light; a collimator 20 configured to collimate the single-wavelength light emitted from the light source 10; a first beam splitter 30 configured to split the single-wavelength light that has passed through the collimator 20 into object light O and reference light R; an object light objective lens 40 through which the object light O obtained by the first beam splitter 30 passes; a reference light objective lens 60 through which the reference light R obtained by the first beam splitter 30 passes; an optic mirror 70 reflecting the reference light R that has passed through the reference light objective lens 60; a recording medium 80 configured to record an interference pattern formed when the object light O reflected by a surface of a measurement target object 50 and the reference light R reflected by the optic mirror 70 are transmitted to the first beam splitter 30 respectively through the object light objective lens 40 and the reference light objective lens 60; and a processor 90 configured to receive and store an image file generated when the recording medium 80 converts the interference pattern, wherein the processor is further configured to generate digital reference light by extracting reference light information of an object hologram from the object hologram obtained from the image file, and reconstruct 3-dimensional (3D) information of the measurement target object 50 by calculating an object hologram that is compensated for by using the object hologram and the digital reference light and extracting phase information of the compensated object hologram.

Figure 2B:
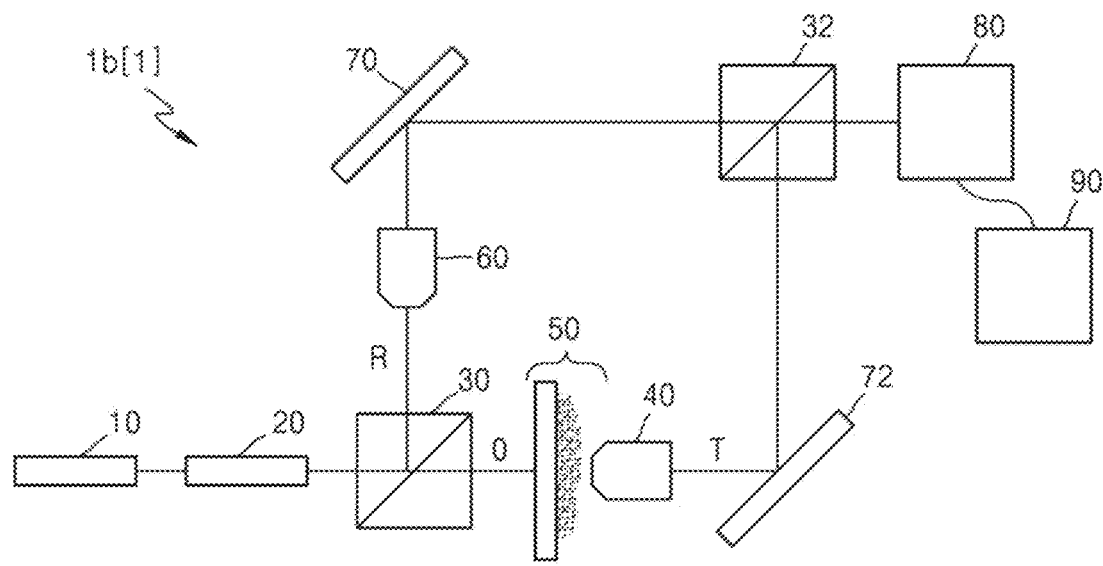
FIG. 2B is a block diagram of a holographic reconstruction apparatus according to a second embodiment of the present disclosure.

FIG. 2B is a block diagram of a holographic reconstruction apparatus according to a second embodiment of the present disclosure.

Referring to FIG. 2B, a holographic reconstruction apparatus 1b according to the second embodiment of the present disclosure includes: the light source 10 configured to emit a single-wavelength light; the collimator 20 configured to collimate the single-wavelength light emitted from the light source 10; the first beam splitter 30 configured to split the single-wavelength light that passed through the collimator 20 into the object light O and the reference light R; the reference light objective lens 60 through which the reference light R obtained by the first beam splitter 30 passes; a first optic mirror 70 reflecting the reference light R that passed through the reference light objective lens 60; the object light objective lens 40 through which an object penetration light T including information of the measurement target object 50 passes after the object light O obtained by the first beam splitter 30 passes through the measurement target object 50; a second optic mirror 72 reflecting the object penetration light T that passed through the object light objective lens 40; the first beam splitter 30a second beam splitter 32 to which the reference light R reflected by the first optic mirror 70 and the object penetration light T reflected by the second optic mirror 72 are transmitted; the recording medium 80 configured to record an interference pattern formed by the reference light R and the object penetration light T, which are transmitted to the second beam splitter 32; and the processor 90 configured to receive and store an image file generated when the recording medium 80 converts the interference pattern, wherein the processor 90 is further configured to generate digital reference light by extracting reference light information of an object hologram from the object hologram obtained from the image file, and reconstruct 3D information of the measurement target object 50 by calculating an object hologram that is compensated for by using the object hologram and the digital reference light and extracting phase information of the compensated object hologram.

The holographic reconstruction apparatus 1a according to the first embodiment of the present disclosure and the holographic reconstruction apparatus 1b according to the second embodiment of the present disclosure respectively shown in FIGS. 2A and 2B substantially have the same structure except that the object light O is reflected by the measurement target object 50 (the embodiment of FIG. 2A) or the object light O passes through the measurement target object 50 (the embodiment of FIG. 2B), and thus some components (for example, the second optic mirror 72 and the second beam splitter 32 in the embodiment of FIG. 2B) are additionally used and arranged, and in particular, have the same characteristics in that the interference pattern is recorded on the recording medium 80 and the digital reference light is generated from the object hologram obtained by the processor 90 in a form of the image file based on the recorded interference pattern. Accordingly, hereinafter, the holographic reconstruction apparatuses 1a and 1b according to the first and second embodiments of the present disclosure will be collectively referred to as a holographic reconstruction apparatus 1 according to an embodiment of the present disclosure.

The processor 90 of the holographic reconstruction apparatus 1 according to the embodiment of the present disclosure may be, for example, an apparatus capable of arithmetic calculation, such as a microprocessor or a personal computer (PC), and the recording medium 80 may be an image sensor, such as a charge coupled device (CCD) or a complementary metal-oxide semiconductor (CMOS).

Also, information of the object hologram obtained by the processor 90 of the holographic reconstruction apparatus 1 according to the embodiment of the present disclosure includes a wavelength and phase information of an object, and a curvature aberration of the object light objective lens 40, and may additionally include noise (for example, speckle noise according to use of photons of a laser beam).

Also, the object hologram obtained by the processor 90 of the holographic reconstruction apparatus 1 according to the current embodiment of the present disclosure is a complex conjugation hologram, and may be represented by Equation 1 below.

$$|U_o(x,y,0)|^2 = |O(x,y)|^2 + |R(x,y)|^2 + O^*(x,y)R(x,y) + O(x,y)R^*(x,y) \quad \text{Equation 1:}$$

In Equation 1, x and y denote spatial coordinates, $U_o(x,y,0)$ denotes the obtained object hologram, $O(x,y)$ and $R(x,y)$ respectively denote the object light O and the reference light R, and $O^*(x,y)$ and $R^*(x,y)$ respectively denote complex conjugations of the object light O and the reference light R.

Hereinafter, a detailed method of generating the digital reference light and a compensated object hologram from the obtained object hologram is described.

Figure 2C:
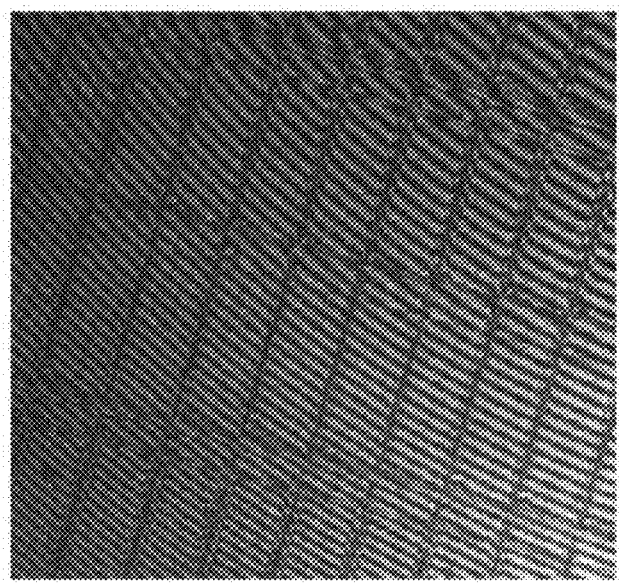
FIG. 2C is a view of an object hologram of a thin-film transistor (TFT), according to an embodiment of the present disclosure.

First, the processor 90 of the holographic reconstruction apparatus 1 according to the embodiment of the present disclosure obtains the object hologram (see a thin-film transistor (TFT) of FIG. 2C) from the image file of the interference pattern recorded on the recording medium 80. The obtained object hologram is formed of an interference pattern of the object light O having phase information of an object and the reference light R not having the phase information of the object.

Then, 2D Fourier transform is performed on the obtained object hologram to extract, from the obtained object hologram, information of the reference light R not having the phase information of the object. A frequency spectrum of the object hologram obtained via the 2D Fourier transform is separated into spectrum information including a real image spot-position, spectrum information including an imaginary image spot-position, and spectrum information including direct current (DC) information. Only the real image spot-position is extracted from the frequency spectrum by using an automatic real image spot-position extraction algorithm. The reference light information of the obtained object hologram is extracted by using the extracted real image spot-position.

Figure 2D:
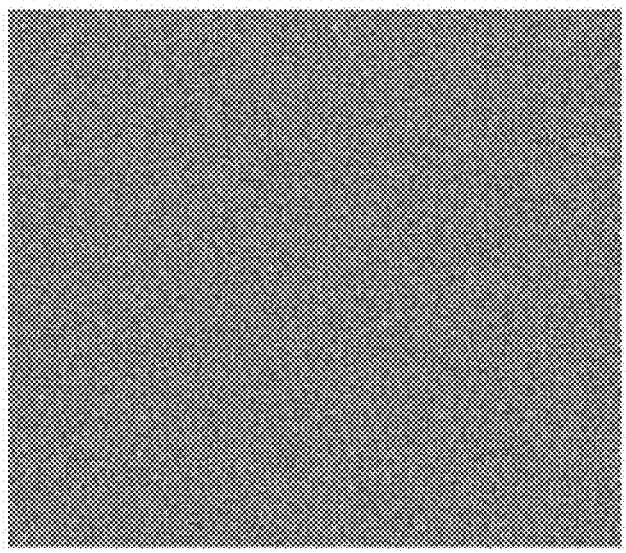
FIG. 2D is a view of digital reference light that is a compensation term obtained by calculating a wavenumber vector constant from reference light information of an object hologram extracted from an object hologram of the TFT of FIG. 2C by using an automatic real image spot-position extraction algorithm.

Then, a phase breaking phenomenon may occur every 2 π of the extracted reference light information due to a wave nature of light, and in order to compensate for the phase breaking phenomenon, the processor 90 calculates a wavenumber vector constant of the extracted reference light information by using a wavenumber algorithm. A compensation term of the extracted reference light information is calculated by using the calculated wavenumber vector constant. The compensation term of the extracted reference light information calculated from the wavenumber vector constant is a conjugate of the reference light information of the obtained object hologram. The calculated compensation term of the extracted reference light information is referred to as digital reference light (see FIG. 2D), and is represented by Equation 2.

$$R_c(x,y) = \text{conj}[R(x,y)] \quad \text{Equation 2:}$$

Here, $R_c(x,y)$ denotes the digital reference light, $R(x,y)$ denotes the reference light information of the obtained object hologram, and conj denotes a function of obtaining a conjugate complex number.

Then, in order to compensate for a curvature aberration of the object light objective lens 40 used to obtain the object hologram, the processor 90 extracts curvature aberration information from the object hologram. Then, the processor 90 generates a curvature aberration information compensation term by using an automatic frequency curvature compensation algorithm. Here, the curvature aberration information compensation term is referred to as digital curvature.

Then, the processor 90 calculates the compensated object hologram by multiplying the compensation term of the extracted reference light information by the obtained object hologram. This is represented by Equation 3.

$$U_C(x,y,0)=O(x,y)R^*(x,y)R_C(x,y)R_{CA}(x,y) \quad \text{Equation 3:}$$

In Equation 3, $U_C(x,y,0)$ denotes the compensated object hologram, $O(x,y)$ and $R^*(x,y)$ respectively denote the object light and the reference light of the obtained object hologram, $R_C(x,y)$ denotes the digital reference light, and $R_{CA}(x,y)$ denotes the digital curvature.

Then, the processor 90 converts the compensated object hologram to information of a reconstructed image plane by using an angular spectrum propagation algorithm. Here, the reconstructed image plane denotes a virtual image display plane at a location corresponding to a distance between the measurement target object 50 and the recording medium 80, and may be calculated and simulated by the processor 90. The processor 90 extracts the phase information of the compensated object hologram via inverse 2D Fourier transform. It should be noted that since the information of light in the obtained object hologram and the curvature aberration information of the objective lens are removed from the phase information extracted as such, the phase information of the extracted compensated object hologram includes only the phase information of the object.

Then, the processor 90 calculates quantitative thickness information of the measurement target object 50 by using the extracted phase information of the compensated object hologram. In this case, the extracted phase information of the compensated object hologram may additionally include fine noise, such as speckle noise, due to use of photons of a laser beam, and thus the processor 90 may pre-remove the fine noise before calculating the quantitative thickness information of the measurement target object 50. In detail, the processor 90 may compensate for distorted phase information generated by the fine noise and a wrapped phase phenomenon from the extracted phase information of the compensated object hologram, by using a 2D phase unwrapping algorithm. When the distorted phase information generated by the fine noise and the wrapped phase phenomenon is removed, the quantitative thickness information of the measurement target object 50 may be further precisely calculated based on the phase information of the compensated object hologram. The quantitative thickness information of the measurement target object 50 calculated as above is represented by Equation 4.

$$\Delta L = \lambda \Delta \varphi(x,y)/2\pi \Delta n(x,y) \quad \text{Equation 4:}$$

In Equation 4, $\Delta L$ denotes the quantitative thickness information of the measurement target object 50, $\lambda$ denotes a wavelength of the light source 10 used to obtain the object hologram, $(x,y)$ denotes the phase information of the compensated object hologram, and $\Delta n(x,y)$ denotes a refractive index difference between the background (or air) and the measurement target object 50. The processor 90 reconstructs a 3D shape of the measurement target object 50 on the reconstructed image plane by using the quantitative thickness information of the measurement target object 50 calculated according to Equation 4. The reconstructed image plane reconstructed by the processor 90 may be displayed, for example, on a separate monitor (not shown).

Figure 2E:
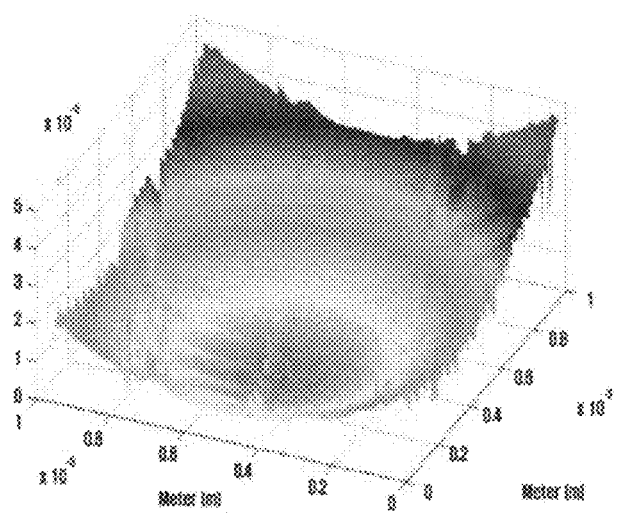
FIG. 2E is a view of a reconstructed image of a 3-dimensional (3D) image of a measurement target object on which curvature aberration correction of an object light objective lens is not performed.
Figure 2F:
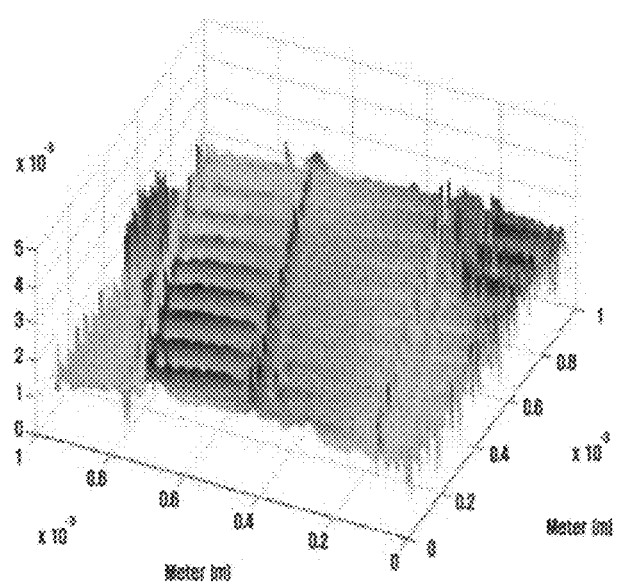
FIG. 2F is a view of a reconstructed image of a 3D image of a measurement target object on which curvature aberration correction of an object light objective lens is performed.
Figure 2G:
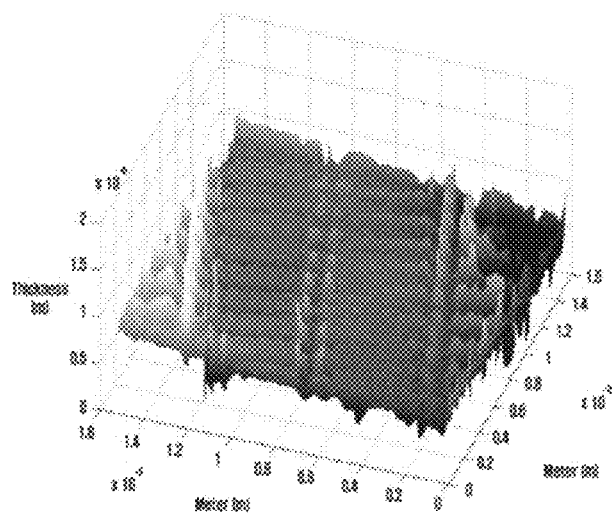
FIG. 2G is a view of a 3D shape reconstructed image of the TFT of FIG. 2C containing quantitative thickness information calculated by using extracted phase information of a compensated object hologram, according to the present disclosure.

FIGS. 2E and 2F are views of a reconstructed image of a 3D shape of the measurement target object 50 on which curvature aberration correction of the object light objective lens 40 is not performed, and a reconstructed image of a 3D shape of the measurement target object 50 on which curvature aberration correction of the object light objective lens 40 is performed. Also, FIG. 2G is a view of a 3D shape reconstructed image of the TFT of FIG. 2C having the quantitative thickness information calculated by using the extracted phase information of the compensated object hologram, according to the present disclosure. Referring to the reconstructed images of FIGS. 2F and 2G, it is determined that the 3D shape of the semiconductor substrate circuit of FIG. 2C is clearly reconstructed.

Figure 3:
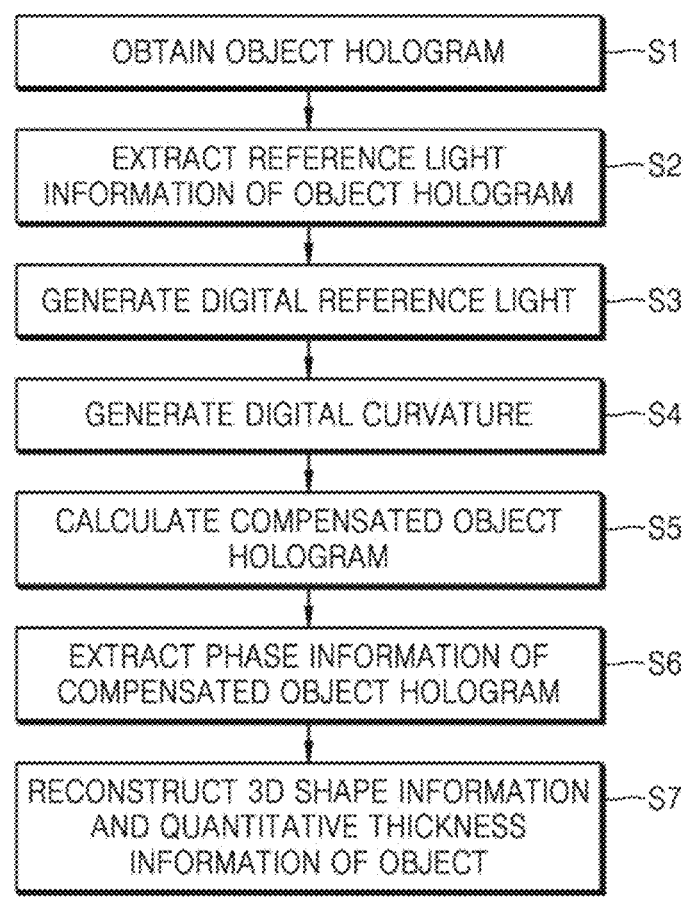
FIG. 3 is a flowchart of a holographic reconstruction method according to an embodiment of the present disclosure.

FIG. 3 is a flowchart of a holographic reconstruction method according to an embodiment of the present disclosure.

Referring to FIG. 3 together with FIGS. 2A through 2G, a holographic reconstruction method according to an embodiment of the present disclosure includes: obtaining an object hologram of the measurement target object 50, in operation S1; extracting reference light information from the obtained object hologram, in operation S2; calculating a wavenumber vector constant of the extracted reference light information, and generating digital reference light by calculating a compensation term of the reference light information by using the calculated wavenumber vector constant, in operation S3; extracting curvature aberration information from the object hologram, and then generating digital curvature in which a curvature aberration is compensated for, in operation S4; calculating a compensated object hologram by multiplying the compensation term of the reference light information by the obtained object hologram, in operation S5; extracting phase information of the compensated object hologram, in operation S6; and reconstructing 3D shape information and quantitative thickness information of the measurement target object 50 by calculating the quantitative thickness information of the measurement target object 50 by using the extracted phase information of the compensated object hologram, in operation S7.

In the holographic reconstruction method according to an embodiment of the present disclosure, operation S1 may include: splitting, by the first beam splitter 30, the single-wavelength light emitted from the light source 10 into the object light O and the reference light R; reflecting the object light O from a surface of the measurement target object 50 through the object light objective lens 40, and reflecting the reference light R at an optic mirror 70 after passing the reference light R through the reference light objective lens 60; recording the interference pattern formed when the reflected object light O and the reflected reference light R are transmitted to the first beam splitter 30 on the recording medium 80, and transmitting, to the processor 90, the image file generated by converting the interference pattern; and obtaining, by the processor 90, the object hologram from the image file.

Alternatively, in the holographic reconstruction method according to an embodiment of the present disclosure, operation S1 may include: splitting, by the first beam splitter 30, the single-wavelength light emitted from the light source 10 into the object light O and the reference light R; reflecting the object penetration light T obtained by passing the object light O through the measurement target object 50 at the second optic mirror 72 after passing the object penetration light T through the object light objective lens 40, and reflecting the reference light R at the optical mirror 70 after passing the reference light R through the reference light objective lens 60; recording the interference pattern formed by transmitting the reflected object penetration light T and the reflected reference light R to the second beam splitter 32, on the recording medium 80, and transmitting the image file generated by converting the interference pattern to the processor 90; and obtaining, by the processor 90, the object hologram from the image file.

Also, in the holographic reconstruction method according to an embodiment of the present disclosure, operation S2 may include: performing inverse 2D Fourier transform on the obtained object hologram; extracting, by using an automatic real image spot-position extraction algorithm, only a real image spot-position from a frequency spectrum that is obtained via the 2D Fourier transform and includes spectrum information including the real image spot-position of the object hologram, spectrum information including imaginary image spot-position, and spectrum information including DC information; and extracting the reference light information of the obtained object hologram by using the extracted real image spot-position.

Also, in the holographic reconstruction method according to an embodiment of the present disclosure, the calculated compensation term in operation S3 is a conjugate of the obtained object hologram and is the digital reference light, and is represented by $R_C(x,y)=conj[R(x,y)]$, wherein $R_C(x,y)$ denotes the digital reference light, $R(x,y)$ denotes the reference light information of the obtained object hologram, and conj denotes a function for obtaining a conjugate complex number.

Also, in the holographic reconstruction method according to an embodiment of the present disclosure, the compensated object hologram calculated in operation S5 is represented by $U_C(x,y,0)=O(x,y)R^*(x,y)R_C(x,y)R_{CA}(x,y)$, wherein $U_C(x,y,0)$ denotes the compensated object hologram, $O(x,y)$ and $R^*(x,y)$ respectively denote the object light and the reference light of the obtained object hologram, $R_C(x,y)$ denotes the digital reference light, and $R_{CA}(x,y)$ denotes the digital curvature.

Also, in the holographic reconstruction method according to an embodiment of the present disclosure, the phase information of the compensated object hologram in operation S6 is extracted via inverse 2D Fourier transform, wherein the extracted phase information includes only phase information of the measurement target object as light information and curvature aberration information of an objective lens are removed from the obtained object hologram. Here, operation S6 may further include, when the phase information of the compensated object hologram includes fine noise and a wrapped phase phenomenon, removing the fine noise and the wrapped phase phenomenon by using a 2D phase unwrapping algorithm.

Also, in the holographic reconstruction method according to an embodiment of the present disclosure, the quantitative thickness information calculated in operation S7 is represented by $\Delta L=\lambda \Delta\varphi(x,y)/2\pi\Delta n(x,y)$, wherein $\Delta L$ denotes the quantitative thickness information, $\lambda$ denotes a wavelength of the light source, $\Delta\varphi(x,y)$ denotes the phase information of the compensated object hologram, and $\Delta n(x,y)$ denotes a difference in refractive index between air and the measurement target object.

As described above, in the improved holographic reconstruction apparatus 1 and method according to the present disclosure, since the processor 90 reconstructs 3D information of the measurement target object 50 by only using the obtained object hologram and the digital reference light generated from the obtained object hologram, issues related to a complex structure of an optical apparatus required during conventional one-shot-type digital holography reconstruction using one object hologram and consequent high costs may be solved.

Also, in the improved holographic reconstruction apparatus 1 and method according to the present disclosure, since the holographic reconstruction apparatus 1 additionally uses only the processor 90, an overall structure is very simple and a hologram may be reconstructed with low costs.

Also, in the improved holographic reconstruction apparatus 1 and method according to the present disclosure, since the holographic reconstruction apparatus 1 substantially has the same structure as conventional reflective and transmissive hologram reconstruction apparatuses except for the processor 90, the improved holographic reconstruction apparatus 1 and method have general versatility of being applied to both the conventional reflective and transmissive hologram reconstruction apparatuses.

Also, in the improved holographic reconstruction apparatus 1 and method according to the present disclosure, in particular, a reference hologram is not required during hologram reconstruction, and a quantitative 3D image of the measurement target object 50 may be reconstructed in real time.

Also, in the improved holographic reconstruction apparatus 1 and method according to the present disclosure, since the quantitative 3D image of the measurement target object 50 may be reconstructed in real time without having to use the reference hologram, the improved holographic reconstruction apparatus 1 and method may be applied to defect detecting apparatuses having a ultrafine structure, such as a TFT and a semiconductor, medical devices that need to display a precise 3D image, and other detecting, determining, or displaying apparatuses in various fields including refractive index error detection of a transparent object, such as a lens.

INDUSTRIAL APPLICABILITY

While one or more embodiments have been described with reference to the figures, it will be understood by those of ordinary skill in the art that various changes in form and details may be made therein without departing from the spirit and scope as defined by the following claims.

The invention claimed is:

1. A holographic reconstruction apparatus comprising:
a light source configured to emit single-wavelength light;
a collimator configured to collimate the single-wavelength light emitted from the light source;
a first beam splitter configured to split the single-wavelength light that passed through the collimator into object light and reference light;
an object light objective lens through which the object light obtained by the first beam splitter passes;
a reference light objective lens through which the reference light received by the first beam splitter passes;
an optic mirror reflecting the reference light that has passed through the reference light objective lens;
a recording medium configured to record an interference pattern formed when the object light reflected by a surface of a measurement target object and the reference light reflected by the optic mirror pass through the object light objective lens and the reference light objective lens, respectively, and are transmitted to the first beam splitter; and
a processor configured to receive and store an image file generated when the recording medium converts the interference pattern,
wherein the processor is further configured to generate digital reference light by extracting reference light information of an object hologram from the object hologram obtained from the image file, and reconstruct 3-dimensional (3D) information of the measurement target object by calculating an object hologram that is compensated for by using the object hologram and the digital reference light and extracting phase information of the compensated object hologram, and wherein the processor is further configured to extract the reference light information by:

performing 2D Fourier transform on the obtained object hologram, and extracting, by using an automatic real image spot-position extraction algorithm, only a real image spot-position from a frequency spectrum that is obtained via the 2D Fourier transform and comprises spectrum information including the real image spot-position of the object hologram, spectrum information including imaginary image spot-position, and spectrum information including direct current (DC) information; and extracting the reference light information of the obtained object hologram by using the extracted real image spot-position.

2. The holographic reconstruction apparatus of claim 1, wherein the processor is further configured to generate the digital reference light by:

calculating a wavenumber vector constant of the extracted reference light information; and calculating a compensation term of the extracted reference light information by using the calculated wavenumber vector constant.

3. The holographic reconstruction apparatus of claim 2, wherein the digital reference light is represented by $R_c(x,y)=\text{conj}[R(x,y)]$, wherein $R_c(x,y)$ denotes the digital reference light, $R(x,y)$ denotes the reference light information of the obtained object hologram, and conj denotes a function for obtaining a conjugate complex number.

4. The holographic reconstruction apparatus of claim 2, wherein the processor is further configured to extract curvature aberration information from the object hologram to compensate for a curvature aberration of the object light objective lens, and then generate digital curvature that is a curvature aberration information compensation term by using an automatic frequency curvature compensation algorithm.

5. The holographic reconstruction apparatus of claim 4, wherein the compensated object hologram is calculated by multiplying the calculated compensation term of the extracted reference light information by the obtained object hologram.

6. The holographic reconstruction apparatus of claim 5, wherein the compensated object hologram is represented by $U_C(x,y,0)=O(x,y)R^*(x,y)R_C(x,y)R_{CA}(x,y)$, wherein $U_C(x,y,0)$ denotes the compensated object hologram, $O(x,y)$ and $R^*(x,y)$ respectively denote the object light and the reference light of the obtained object hologram, $R_C(x,y)$ denotes the digital reference light, and $R_{CA}(x,y)$ denotes the digital curvature.

7. The holographic reconstruction apparatus of claim 1, wherein the processor is further configured to convert the compensated object hologram to information of a reconstructed image plane by using an angular spectrum propagation algorithm, extract phase information of the compensated object hologram through inverse 2D Fourier transform, and reconstructs 3D shape information and quantitative thickness information of the measurement target object by calculating the quantitative thickness information of the measurement target object by using the extracted phase information.

8. The holographic reconstruction apparatus of claim 7, wherein the quantitative thickness information is represented by $\Delta L = \lambda \Delta \varphi(x,y)/2\pi \Delta n(x,y)$, wherein $\Delta L$ denotes the quantitative thickness information, $\lambda$ denotes a wavelength of the light source, $\Delta \varphi(x,y)$ denotes the phase information of the compensated object hologram, and $\Delta n(x,y)$ denotes a difference in refractive index between air and the measurement target object.

* * * * *